Figure 1:
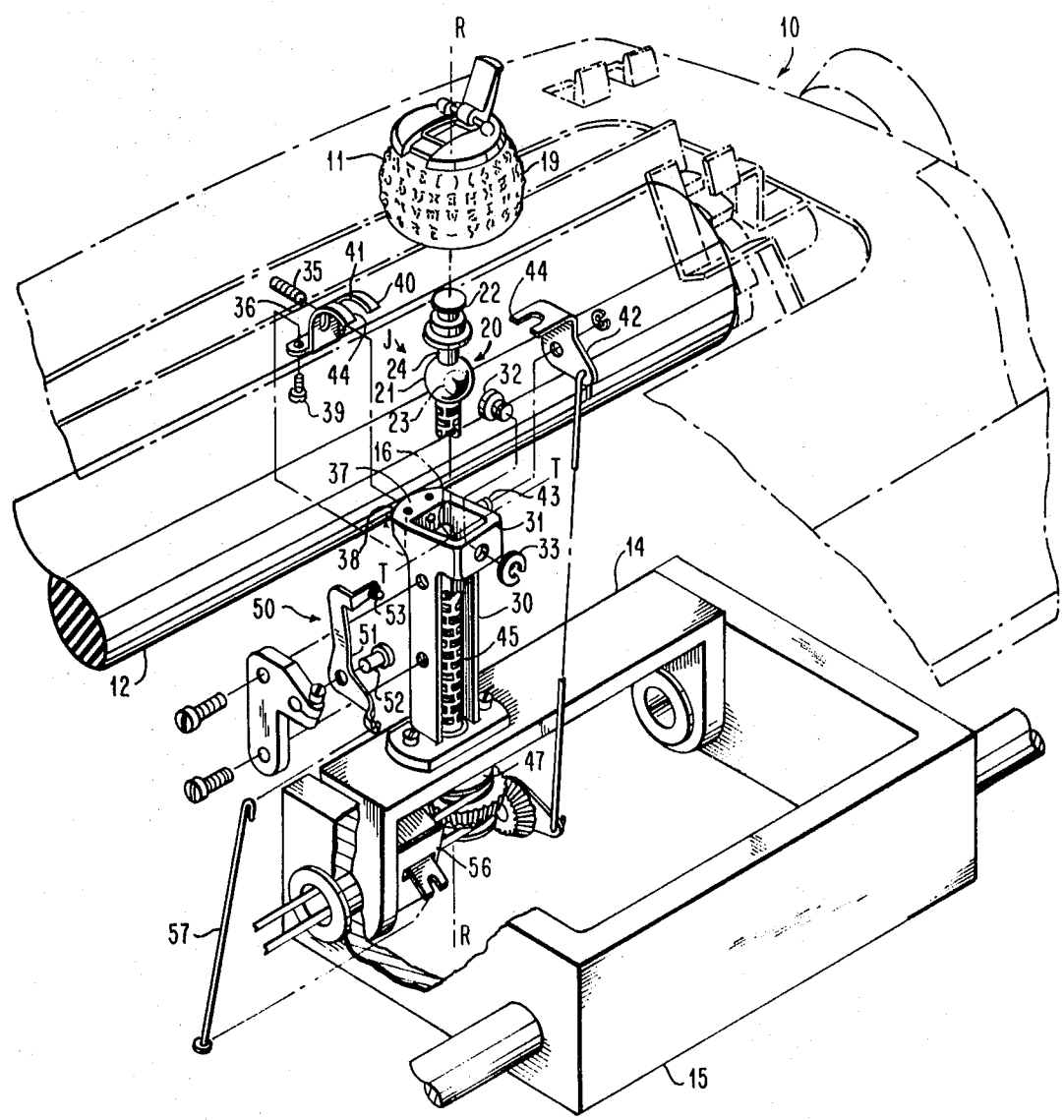

United States Patent

[11] 3,618,735

[72] Inventor Charles D. Bleau
        Lexington, Ky.
[21] Appl. No. 884,421
[22] Filed Dec. 12, 1969
[45] Patented Nov. 9, 1971
[73] Assignee International Business Machines
        Corporation
        Armonk, N.Y.

[54] SPHERICAL TYPE ELEMENT SUPPORT
    11 Claims, 2 Drawing Figs.
[52] U.S. Cl. .................................. 197/16,
        197/52, 197/55
[51] Int. Cl. .................................. B41j 1/60
[50] Field of Search .................... 197/16, 52,
        55; 287/21

[56] References Cited
    UNITED STATES PATENTS
2,902,132  9/1959  Walker ..................... 197/52
3,420,350  1/1969  Decker ..................... 197/52
3,286,806  11/1966 Schoenfelder .............. 197/16
3,247,941  4/1966  Beattie et al. ............ 197/55
3,432,018  3/1969  Watanabe ................... 197/55 X
1,652,463  12/1927 Tyberg ..................... 197/16
1,488,796  4/1924  Parsons .................... 287/21
1,434,904  11/1922 Mansfield .................. 287/21 X
2,877,069  3/1959  Dispenza ................... 287/21
2,695,185  11/1954 Latzen ..................... 287/21 X Primary Examiner—Robert E. Pulfrey
Assistant Examiner—R. E. Suter
Attorneys—Hanifin and Jancin and E. Ronald Coffman ABSTRACT: A simplified articulated joint for a spherical-type element is provided by a ball retained in a specially oriented, restricted surface bearing member such that impact and detent forces are directly absorbed by the bearing member.

PATENTED NOV 9 1971

3,618,735

INVENTOR
CHARLES D. BLEAU

BY E. Ronald Coffman
ATTORNEY

SPHERICAL TYPE ELEMENT SUPPORT

BACKGROUND OF THE INVENTION

Character-by-character printers having spherical-type elements inherently require some form of a universal joint to accommodate the biaxial motion required for character selection. U.S. Pat. No 2,895,584 teaches a very practical form of universal joints currently in commercial use. Other forms of universal joints for this purpose may be found in U.S. Pat. Nos. 2,902,132 and 696,833. It has been the object of the present invention to provide an improved articulated joint for a spherical type element that differs form those earlier approaches to the problem by seeking practical simplicity, tolerance to wear, and low character selection inertia.

DISCLOSURE OF THE INVENTION

In this invention a spherical-type element is secured to a mounting member that includes a spherical ball concentric with the type element. The mounting member is concentrated axially of the type element so as to contribute a minimum moment of inertia to the type element during character selection motion.

The ball of the mounting member is supported by entrapment between a concave bearing surface and an opposed, low friction, point contact-retaining member. The bearing surface faces toward the impact point and away from the point of application of a detent force to most effectively absorb these forces.

As the bearing member is restricted to encompass less than a hemisphere of the mounting member ball, the expense of avoiding and correcting eccentricities in the part is minimized. To minimize character selection inertia, neither the articulated joint nor the type element positioning mechanisms themselves are relied on to restrict the free motion of the mounting member to motion about either of two coordinate axes. Instead a relatively stationary guide track which thus does not contribute to the selection system inertia is relied on to provide this function. Dual coordinate character selection motion is preferably transmitted from independent sources to the type element by means including at least one flexible shaft.

Figure 2:
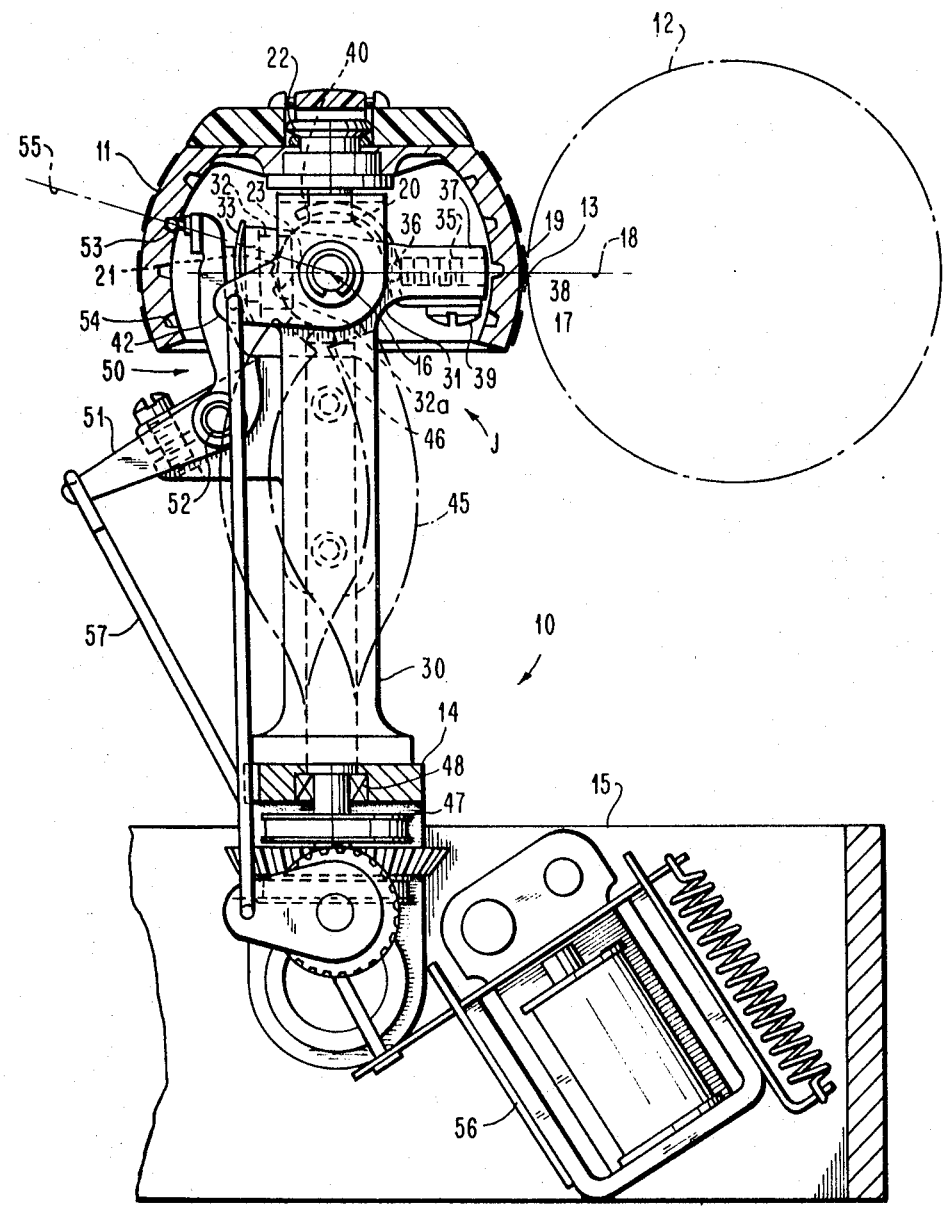

These and other objects, features, and advantages of my invention will be further apparent to those skilled in the art from the following more specific description of a preferred illustrative embodiment thereof, wherein references made to the accompanying drawing, of which:

FIG. 1 is a partially exploded perspective view of a typewriter having an improved articulated type element support structure constructed in accordance with my invention; and FIG. 2 is an enlarged side elevational view of the type element support structure shown in FIG. 1.

More specifically, the drawings show a typewriter or printer 10 having a spherical-type element 11 positioned adjacent a paper holding platen 12 to define a character print point 13 therebetween.

The type element 11 is supported from a lower rocker part 14 for movement relative to the platen 12 for printing characters by impact. The rocker 14 is pivotally supported on a carrier 15 that is movable axially of the platen 12 for letter spacing between adjacent characters. The basic arrangement of the typewriter 10 is like that disclosed in U.S. Pat. No. 2,919,002.

In accordance with my invention the type element 11 is connected to the lower rocker 14 through a articulated support joint J comprising an upper or element mounting member 20 and a lower or support member 30 which is directly connected to the rocker 14. The mounting member 20 includes a spherical ball 21 positioned to be concentric with the center 16 of the type element 11 and further includes a securing device 22 of any suitable construction, such as that disclosed in U.S. Pat. No. 3,307,677 for retaining the type element 11 on the mounting member 20. Support member 30 includes a vertically open upper section 31 positioned adjacent the ball 21. The upper section 31 supports a bearing member 32 having a concave conical face 32a (see particularly FIG. 2) that is oriented toward the print point 13. Bearing member 32 is slidably received in an opening in the upper section 31 and is held in place by a spring "C"-clip 33. The ball 21 slidably engages the concave face 32a and is entrapped thereagainst by an adjustable retaining screw member 35 having a ball-like point or projection 36 on its inner end for contacting the ball 21. The ball point 36 is preferably made of a low friction material.

Screw 33 is mounted in an anvil block 37 formed in the upper section 31 of the support member 30. The anvil block member 37 has a forward surface 38 that closely conforms in shape to the inner surface 17 of the type element 11 and lies directly behind that portion of the type element 11 most directly involved in the print impact. The anvil 37 thus serves to support the thin shell of the spherical-type element 11 against deflection due to force of printing impact.

To obtain maximum advantage from the structure thus described it is necessary to assemble the elements within certain geometrical parameters. Specifically, the concave bearing face 32a should accommodate less than a hemisphere of the ball 21 if maximum tolerance to eccentricities of the parts is to be maintained. Viewing FIG. 2, it will be seen that the type element center 16 and the printing point 13 define a line 18 that is encompassed by a circular closed curve of contact 23 (FIG. 1) between the bearing face 32a and the ball 21. It will also be seen that the retaining ball point 36 lies substantially on this line 18. These relationships contribute to the stability of the articulated joint J and insure that wear and deflection of the involved parts are of little consequence to the quality of printed output.

A curved guide track 40 is secured to the support member 30 by screws 39 for limiting the motion of the type element 11 to motion about two coordinate axes T—T and R—R which intersect at the center 16. The track 40 comprises a slot 41 that straddles a neck portion 24 of the mounting member 20. Inasmuch as the track 40 does not move relative to the support member 30, its mass does not contribute to the inertia relevant to character selection.

A drive fork or crank arm 42 is mounted by a pivot shaft 43 to the support member 30 and engages at its upper forked end 44, the neck portion 24 of the mounting member 20 to position the type element along the tilt axis T—T. A flexible shaft 45 is secured at its upper end to a downwardly extending post portion 46 of the mounting member 20 and is connected at its lower end to an input wheel or pulley 47 that is journaled in a bearing 48 on the rocker 14. Flexible shaft 45 accommodates motion of the type element 11 about tilt axis T—T without interferring with the motion of the type element about the vertical or rotate axis R—R which is transmitted through the shaft 45. The additional mechanism necessary for actually positioning the type element 11 by various predetermined increments about the axes T—T and R—R forms no part of this invention and is within the skill of the art.

A detent mechanism 50 is provided to accurately position and secure the type element 11 during the printing operation to thereby provide accurate impact alignment of the type characters. The detent mechanism 50 employs a detent bellcrank or arm member 51 that is pivoted on the support member 30 by a shaft 52. The upper end of detent arm 51 carries a ball-shaped pawl or tooth 53 that engages one of a plurality of detent depressions 54 formed in the inner surface 17 of the type element 11. Each depression 54 corresponds to a character master 19 selected for printing.

It is desirable that the impact of printing have as little effect on the detent mechanism as possible. Accordingly, the detent pawl 53 is preferably located (as shown particularly in FIG. 2) on the side of center 16 distal from the printing point 13 and on a line of force 55 which it defines with the center 16 that also is encompassed by the contact circle 23. The detent arm 51 is actuated by any suitable means such as an electromagnet 56 connected thereto through a tension or pull member 57, after a character has been selected by positioning of shaft 45 and crank arm 42.

Having thus described the concepts of my invention and a specific illustrative embodiment thereof I define the subject matter sought to be patented by the following claims:

I claim:

1. A printer including a platen and a type element of spherical configuration having a geometrical center, and means mounting said type element and said platen for relative movement into mutual impact cooperation at a printing point; said center and said printing point defining a straight line therebetween during said mutual impact cooperation; wherein the improvement comprises an articulated support for said type element comprising:

a mounting member including a spherical ball, means for securing said type element on said mounting member concentrically with said ball, a support member, a bearing member carried by said support member and having a concave face slidably receiving a portion of said ball along a closed curved line of contact, and oriented toward said platen so that said straight line passes internally of said closed curved line of contact, and a retaining member carried by said support member and entrapping said ball by engaging a portion thereof generally opposite to the portion thereof received by said bearing member.

2. A printer as defined in claim 1 wherein said bearing member encompasses less than a hemisphere of said ball and said retaining member comprises a substantially point contact projection lying substantially on said line.

3. A printer as defined in claim 1 further comprising means for adjustably mounting one of said bearing and retaining members onto said support member for relative movement therebetween along said line.

4. A printer as defined in claim 2 wherein said substantially point contact projection comprises an adjustable screw extending along said line and terminating an engagement with said ball.

5. A printer as defined in claim 1 wherein said bearing member concave face comprises a conical surface.

6. A printer as defined in claim 1 wherein said bearing member encompasses less tan a hemisphere of said ball and said retaining member comprises a substantially point contact projection lying substantially on said line.

7. A printer as defined in claim 4 further comprising anvil means carried by said support member adjacent an inner surface of said type element in a region between said ball and said platen encompassing said line, said anvil means defining a surface closely conforming to said inner surface of said type element for supporting said type element upon deflection thereof, and wherein said adjustable screw is supported by said anvil means.

8. A printer as defined in claim 1 wherein said type element has an inner surface defining a plurality of detent depressions, each associated with a different orientation of said type element and wherein the improvement further comprises:

a detent member movably supported on said support member and having a detent pawl thereon for cooperation with any one of said detent depressions, said detent pawl being located on a side of said bearing member distal from said platen, and said detent pawl and center defining a line of force contained within said encompassing portion of said ball.

9. A printer as defined in claim 1 further comprising means resiliently biasing said bearing member away from said retaining member.

10. A printer as defined in claim 1 wherein said mounting member comprises a neck portion and wherein the improvement further comprises:

a guide track carried by said support member for guidingly engaging said neck portion to restrict movement of said type element to rotation about two independent axes intersecting at said center.

11. A printer as defined in claim 10 further comprising:

a crank arm operatively connected to said mounting member for displacing said type element along said track about one of said axes, and a flexible shaft operatively connected to said mounting member for rotating said mounting member about the other of said axes.

* * * * *